United States Patent

Hirano

[11] Patent Number: 5,771,787
[45] Date of Patent: Jun. 30, 1998

[54] CAKE CONTAINER AND ITS MANUFACTURING METHOD

[75] Inventor: Kunihiro Hirano, Gifu-ken, Japan

[73] Assignee: Hirano Shiki Co., Ltd., Gifu-ken, Japan

[21] Appl. No.: 656,340

[22] PCT Filed: Oct. 31, 1995

[86] PCT No.: PCT/JP95/02222

§ 371 Date: Jul. 9, 1996

§ 102(e) Date: Jul. 9, 1996

[87] PCT Pub. No.: WO96/13978

PCT Pub. Date: May 17, 1996

[30] Foreign Application Priority Data

Nov. 2, 1994 [JP] Japan .................................. 6-269877
Oct. 19, 1995 [JP] Japan .................................. 7-271367

[51] Int. Cl.⁶ .................................................. A21D 8/06
[52] U.S. Cl. ................ 99/426; 99/DIG. 15; 249/DIG. 1; 264/219
[58] Field of Search ............................. 99/426, 432, 433, 99/DIG. 15, 440; 249/117, DIG. 1; 264/219; 53/453; 72/368

[56] References Cited

U.S. PATENT DOCUMENTS

| | | | |
|---|---|---|---|
| 3,107,587 | 10/1963 | Tipton | .................................... 99/426 X |
| 4,184,421 | 1/1980 | Ahlgren | ......................... 99/DIG. 15 X |
| 5,453,287 | 9/1995 | Close | ..................................... 99/426 X |
| 5,582,389 | 12/1996 | Greene | ........................... 99/DIG. 15 X |

FOREIGN PATENT DOCUMENTS

2574627   6/1986   France ............................. 99/DIG. 15
53-14997  7/1951   Japan .

Primary Examiner—Reginald L. Alexander
Attorney, Agent, or Firm—Sheridan Ross P.C.

[57] ABSTRACT

A cake container (1) having a through-hole (16) occupying the entire bottom thereof consists of an annular circumferential wall (2). When the hot plate (8) is heated with the container (1) along with the cake batter (10) placed thereon, the heat is directly transmitted to the cake batter (10) by way of the through hole (16). Thus, the batter (10) is efficiently heated, and the oil added to the batter (10) is also efficiently dispersed. This improves the taste of the cake.

6 Claims, 11 Drawing Sheets

CAKE CONTAINER AND ITS MANUFACTURING METHOD

BACKGROUND OF THE INVENTION

1. Field of the Invention

The present invention relates to a cake container and its manufacturing method.

2. Description of the Prior Art

Conventionally, cake containers for containing cake such as pound cake have a disk-shaped bottom and a circumferential wall extending upward at the periphery of the bottom. When a cake is baked with such a container, the cake batter, containing wheat flour, sugar, cooking oil, etc., is poured into the container, and subsequently, the container is placed on a hot plate. When the hot plate is heated, the cake batter is heated through the bottom of the container, the oil added to the batter is dispersed, the batter swells in accordance with the configuration of the wall, and a cake having a desirable shape is baked.

However, in the conventional containers described above, since the batter is heated through the bottom of the container, the oil added to the batter may not properly disperse due to the poor heat conductivity, which deteriorates the taste of the cake. Furthermore, since the time for heating the cake batter needs to be longer so as to disperse the oil added to the batter, the efficiency of the baking process is lowered.

Accordingly, it is a primary object of the present invention to facilitate the dispersion of oil added to the batter during heating and to improve the taste of the cake.

Another object of the invention is to improve the efficiency of the baking process by shortening the time for heating the batter and to provide a container that efficiently heats the batter with uniformity and is not likely to lose shape.

An additional object of the invention is to efficiently manufacture a container having a through hole formed at the bottom without losing its shape during manufacture.

SUMMARY OF THE INVENTION

To solve the problems described above, in the present invention, a through hole is formed for forming and maintaining the cake batter, which is heated to swell in a predetermined shape. Therefore, when a hot plate, on which the batter filled is placed, is heated, heat is better transmitted to the batter by way of the through hole, and the batter is efficiently heated. This efficient heating facilitates dispersion of the oil added to the batter so that the taste of the cake is improved.

The through hole is preferably formed to be sized more than a given extent in its opening area relative to the entire bottom of the container. In this case, since the through hole that enables the cake batter to be directly heated occupies a large portion of the entire bottom, heat transfer to the cake batter is easier.

The container consists of an annular circumferential wall by forming a through hole that extends over the entire bottom of the container. In this case, when the batter swells during heating, the entire circumferential wall, which is pushed by swelling batter, is brought into an equal expansion in the radial direction.

A flange projecting inward along the circumferential wall may be located at the lower edge of the circumferential wall of the container at its bottom. The through hole may be formed with a size that is identical to the inner periphery of the flange. In this case, the strength of the container is increased by the flange, and the container can be stored without losing its shape.

A plurality of through holes may be formed at the bottom of the container. In this case, a shape-holding force is applied to the container, and the entire cake batter is efficiently heated with uniformity by way of the plurality of through holes.

When a container is manufactured, a through hole is formed in the center of the material of the container, and then, the material is placed between thin plate-like clamp members and is placed between first and second molds. Subsequently, the second mold is fitted into a cavity. When the second mold is fitted into the cavity in the first mold, a plurality of clamp members are bent toward the second mold due to the opening of the cavity. Between the clamp members, which are placed between the outer surface of the second mold and the inner surface of the cavity, the materials are placed relative to the second mold without slipping out of position.

When another container is manufactured, a through hole, the opening of which is smaller than that of the cavity, is formed in the center of the material. After the material is placed between the first and the second molds, the second mold is fitted into the cavity. When the second mold is fitted into the cavity of the first mold, the surface of the second mold opposite to the cavity is pressed against the inner portion of the material, and the outer portion of the material is bent toward the second mold by the opening of the cavity. Then the inner portion of the material is caught on the surface of the second mold opposite to the cavity. The material can be placed between the second mold and the cavity without slipping out of position relative to the second mold.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with accompanying drawings in which:

DETAILED DESCRIPTION OF THE PREFERRED EMBODIMENTS (First Embodiment)

The first embodiment according to the present invention is hereinafter described with reference to FIGS. 1 through 6.

Figure 1:
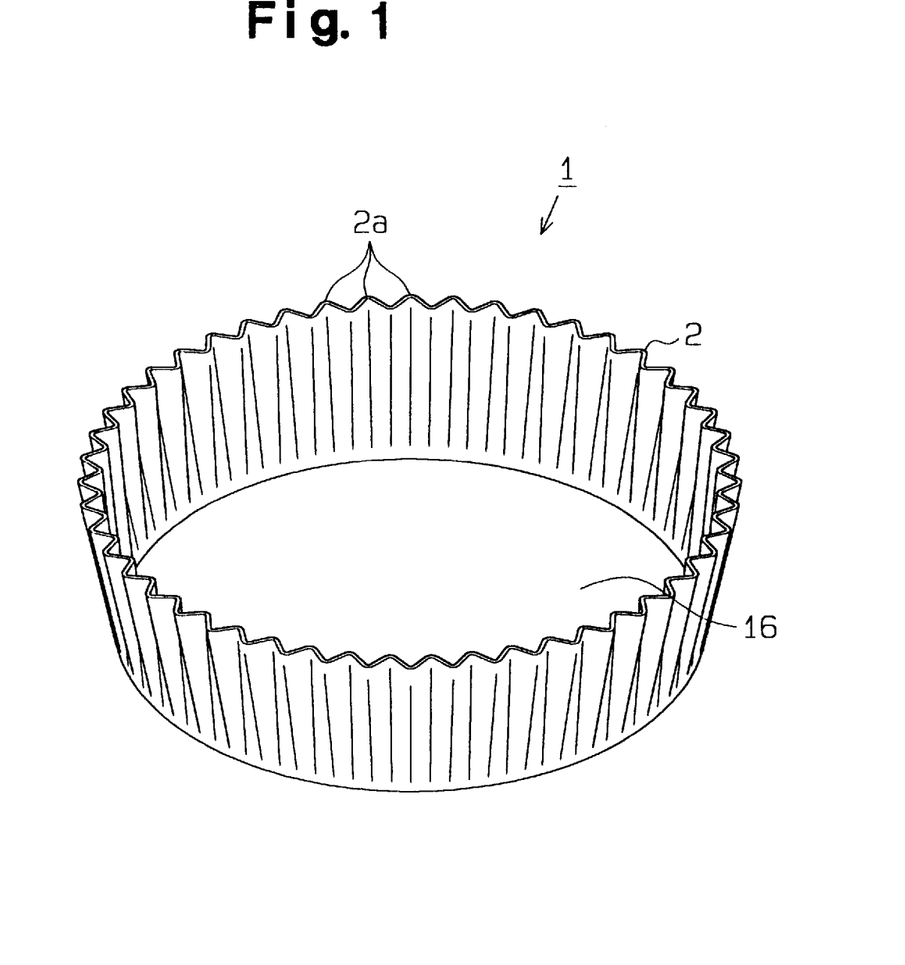
FIG. 1 is a perspective view showing the cake container of the first embodiment.

FIG. 1 illustrates a cake container 1 that consists of a cylindrically and circumferentially extending wall 2. The container 1 has a through hole 16 extending over the entire bottom thereof. The circumferential wall 2 has an upper edge having a diameter greater than that of a lower edge. The wall 2 is provided with folds 2a corrugated in cross section.

Figure 2:
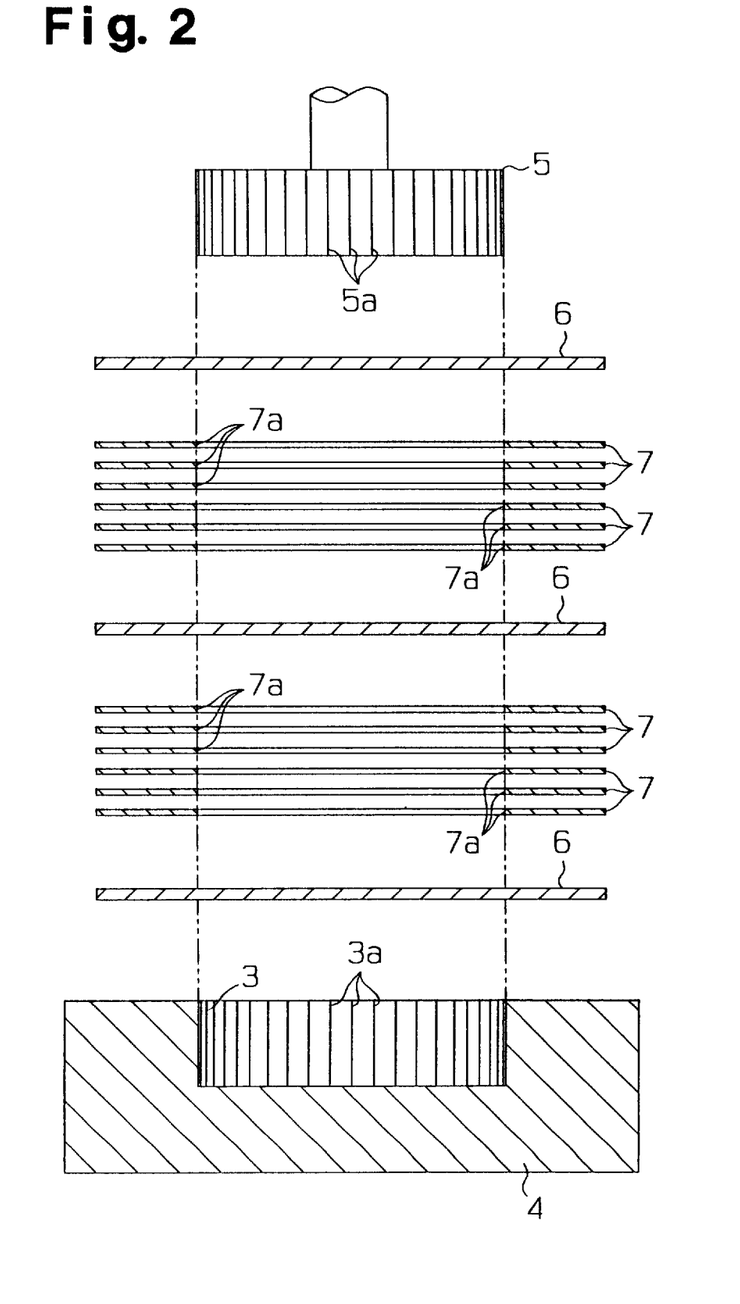
FIG. 2 is a sectional view showing the manufacturing method of the container in the first embodiment.

FIG. 2 illustrates a first mold 4, which is used to manufacture the container 1. The mold 4 has a cavity 3 circularly shaped in cross section. The cavity 3 has on its inner surface a plurality of acute projections 3a. Each of the projections 3a extends in the direction of the axis of the cavity 3. Thus, the inner wall of the cavity 3 is corrugated by the projections 3a, which are located side by side. Opposite to the cavity 3 of the mold 4 is located a cylindrical second mold 5, which is to fit the cavity 3. The second mold 5 has on its outer surface a plurality of projections 5a in conformity with the projections 3a of the cavity 3. The projections 3a and the projections 5a mate with one another when the second mold 5 fits into the cavity 3.

The container 1 is formed by pressing a ring-shaped sheet 7 with the first and second molds 4, 5. As the appropriate material of the sheets 7, any one may be selected among sheet materials with a single layer, such as paper, nonwoven fabric, aluminum foil, etc. The sheet 7 is provided on its surface with a laminating layer including synthetic resin such as polyethylene terephthalate or the like. According to the preferred embodiment, a polyethylene terephthalate film having a thickness of twelve micrometers is selected as the layer to be laminated to white paper having a weight of 65 g/m$^2$ with an adhesive polyethelene layer having a thickness of 13 micrometers.

The sheets 7 have a diameter greater than that of the opening of the cavity 3. The sheets 7 have a hole 7a having a diameter identical to that of the cavity 3.

For simultaneously manufacturing a plurality of the containers 1, three sheets of kraft paper 6 may be placed in parallel to one another between the first and second molds 4, 5. Each kraft paper 6 has a disk-shape having a diameter equal to that of the sheets 7. The sheets of kraft paper 6 serve as clamp members.

A plurality of the sheets 7 (six sheets in the preferred embodiment) are arranged with their laminated surfaces opposed to the second mold 5 and are placed on one another so as to form a set. Subsequently, two sets of the sheets 7 are respectively positioned between sheets of kraft paper 6. The second mold 5 fits the cavity 3 to bend each sheet of kraft paper 6 in the cavity 3 toward the second mold 5. The kraft paper 6 bent between the second mold 5 and the cavity 3 steadily holds the sheets 7 therebetween, resulting in a stable formation of the circumferential wall 2 with the folds 2a. The hole 7a of each sheet 7 forms the through hole 16, which occupies the entire bottom of the container 1 in the preferred embodiment.

The cake is baked by using the above container 1 in the following manner.

Figure 3:
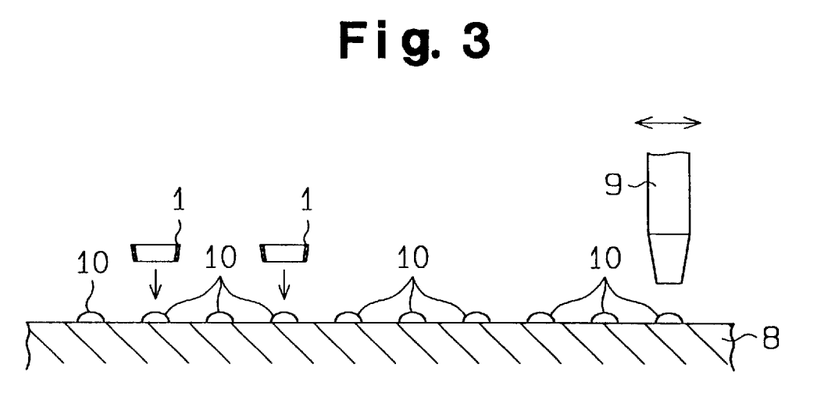
FIG. 3 is a schematic illustration showing the production method of the cake.
Figure 4:
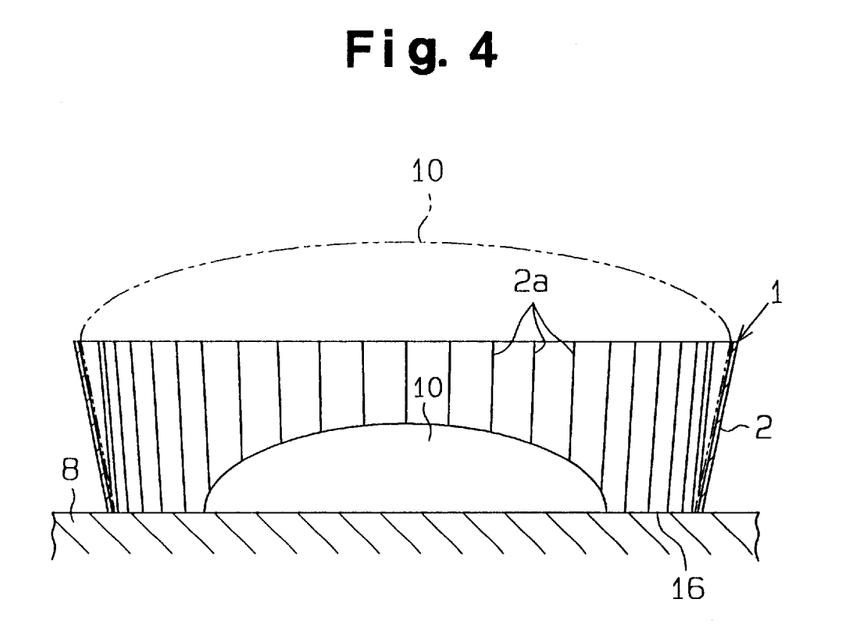
FIG. 4 is a sectional view showing the swelling of the cake.

FIG. 3 illustrates a hot plate 8 and an apparatus 9 for supplying cake batter including wheat flour, sugar a small portion of cooking oil. The apparatus 9 is moved in parallel with the plate 8 to supply cake batter 10 onto the plate 8. Subsequently, the containers 1 are placed on the plate 8 to enclose the cake batter 10 inside their circumferential walls 2. When the plate 8 is heated, the heat is directly transmitted to the cake batter 10 enclosed by the container 1 by way of the through hole 16 occupying the entire bottom. This efficient heating method advantageously facilitates dispersion of the oil contained in the batter 10 and quick expansion of the batter along the circumferential wall 2 (shown by a phantom line in FIG. 4). Furthermore, the direct heating produces a larger swelling of the batter in comparison with the prior art.

Figure 5:
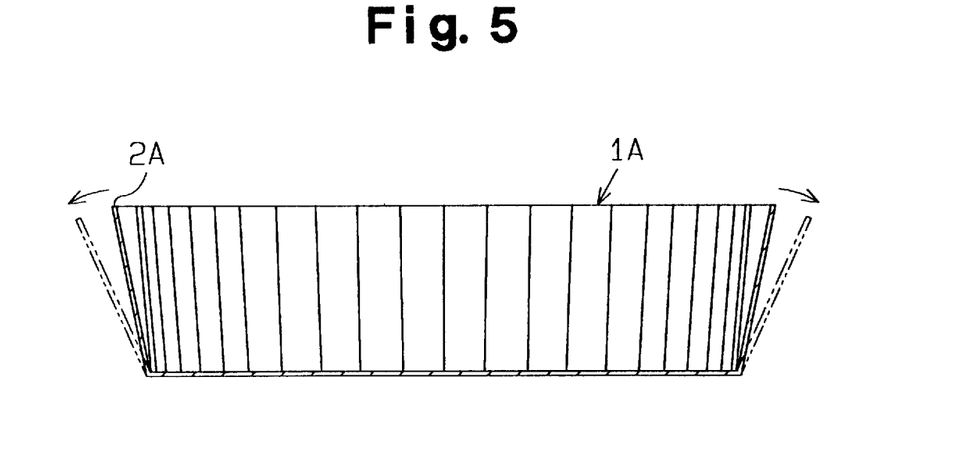
FIG. 5 is a sectional view showing a transformation of the circumferential wall in a conventional container.
Figure 6:
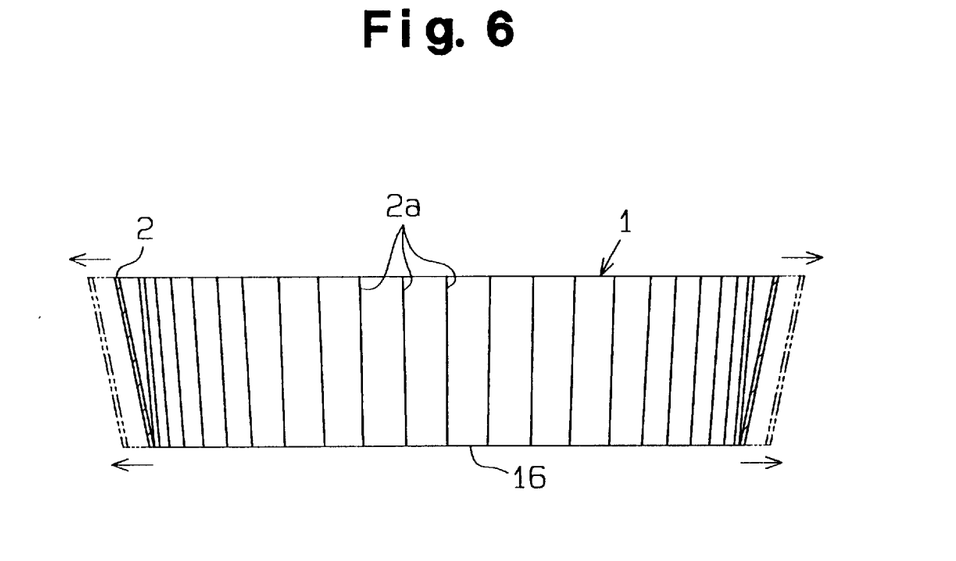
FIG. 6 is a sectional view showing a transformation of the circumferential wall in the container of the first embodiment.

In a conventional container 1A as illustrated in FIG. 5, the swelling of the batter causes the circumferential wall 2A to fall outward and open as shown by a phantom line. However, in the container 1 of the preferred embodiment, the entire circumferential wall 2 is equally expanded in a radial direction as shown by the phantom line in FIG. 6.

The cake baked in the above manner is separated from the container 1 by tearing the wall 2 along a vertical direction. This makes it possible to peel off the torn wall 2 along the circumference of the cake.

In the preferred embodiment as described above, the through hole 16 occupying the entire bottom of the container 1 allows efficient heating of the batter, facilitating the dispersion of oil contained therein. This improves the taste of the cake. Since the batter 10 is efficiently heated by way of the through hole 16 and swells, the heating time of the batter 10 is shortened and the production efficiency of cake is improved. Furthermore, since the heat is directly transmitted to the batter 10 by way of the through hole 16, the batter 10 swells more in comparison with the prior art and this makes the resulting cake look more attractive.

In the container 1 solely consisting of the circumferential wall 2 in the preferred embodiment, the circumferential wall 2 is brought into an equal expansion in a radial direction when it is pushed outward due to the swelling of the batter. This prevents the circumferential wall 2 from falling outward and opening in contrast to the prior art. As a result, the cake is prevented from losing its shape when baked and is formed in a desirable shape.

Moreover, since the circumferential wall 2 of the container 1 is formed in a cylindrical manner, the resulting cake is separated from the container 1 by tearing the wall 2 along a vertical direction and peeling off the torn wall 2 along the circumference of the cake.

In the preferred embodiment, each sheet 7 is positioned between a plurality of sheets of kraft paper 6 when the container 1 is manufactured. Therefore, even if the through hole 7a, having the same diameter as the second mold 5, is formed in each sheet 7, each material 7 is prevented from slipping out of position relative to the second mold 5 when the mold 5 is fitted into the cavity 3. Accordingly, the container 1 is prevented from losing its shape due to slipping of the sheet 7.

Furthermore, in the preferred embodiment, batter 10 is placed on the hot plate 8, and then, the container 1 is placed on the plate 8 to enclose the batter 10 with the circumferential wall 2. The hot plate 8 is heated thereafter. In contrast to the conventional container with a bottom, which must be carried carefully without spilling the batter 10, it is not required to carefully carry the container containing batter 10 to the hot plate 8, which improves production efficiency.

(Second Embodiment)

The second embodiment according to the present invention is hereinafter described with reference to FIGS. 7 and 8.

Figure 7:
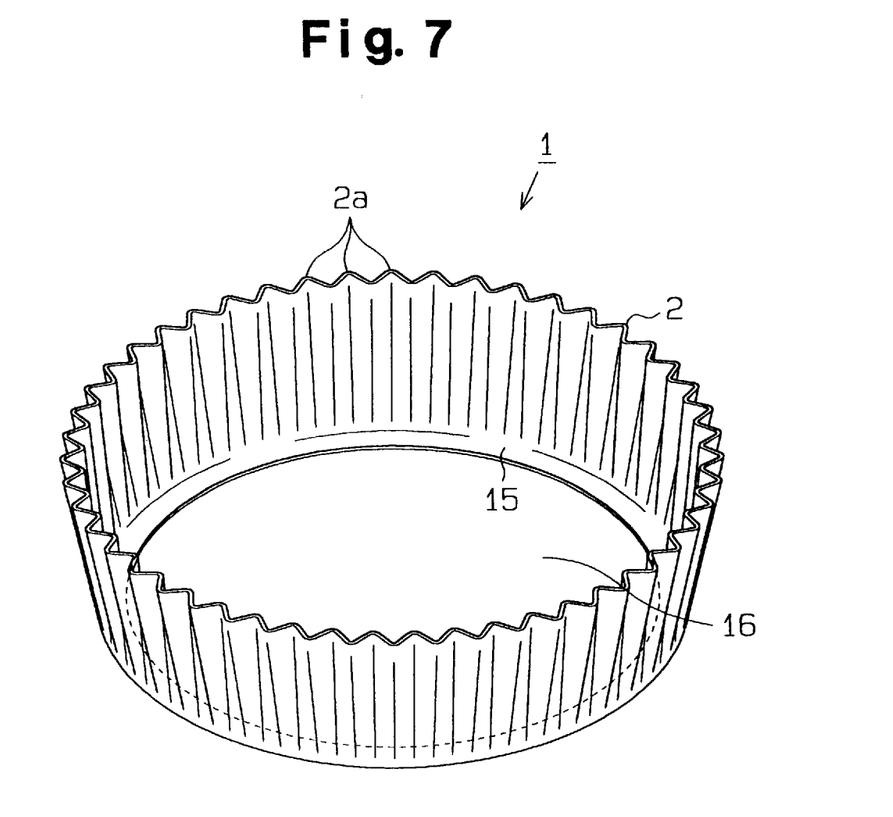
FIG. 7 is a perspective view showing the container in the second embodiment.

As shown in FIG. 7 in the preferred embodiment, a flange 15 projecting inward along the circumferential wall 2 is formed at the lower edge of the circumferential wall 2 of the container 1. Thus, a through hole 16 is formed by the inner periphery of the flange 15 at the bottom of the container 1.

Figure 8:
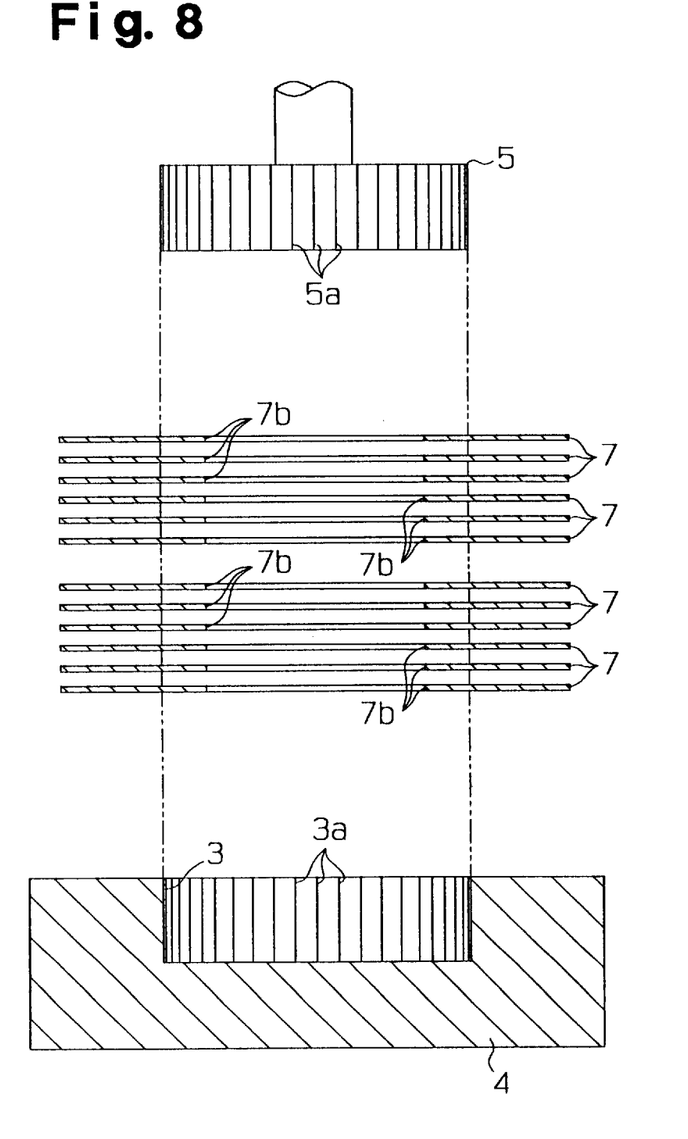
FIG. 8 is a sectional view showing the manufacturing method of the container in the second embodiment.

The container 1 described above is manufactured by press molding sheets 7 illustrated in FIG. 8. A through hole 7b having a diameter slightly smaller than the cavity 3 is formed in the center of the sheet 7. A plurality of the sheets 7 (twelve sheets in the preferred embodiment) are placed on one another between the first mold 4 and the second mold 5.

When the second mold 5 is fitted into the cavity 3, the surface of the second mold 5 opposite to the cavity 3, i.e., the lower surface, is pressed against the inner portion of the sheet 7, and the outer portion of the material 7 is bent toward the second mold 5 by the opening of cavity 3. Since the inner portion of the sheet 7 is caught on the lower surface of the second mold 5, the sheet 7 is positioned between the second mold 5 and the cavity 3 without slipping out of position relative to the mold 5, forming the circumferential wall 2 and the flange 15 without losing shape. Then, a through hole 16, the size of which is identical to the inner periphery of the flange 15, is formed by means of the through hole 7b of the sheets 7 at the bottom of the container 1.

The container 1 as constructed above has increased strength due to the formation of the flange 15. The container 1 does not lose shape during storage.

In the following, an experiment in measuring the baking time by changing the extent of projection of the flange 15 along the circumferential wall 2, i.e., the size of the through hole 16 will be described.

In this experiment, the batter 10 is heated by using (a) the container 1 in the first embodiment, (b) the container 1 in the second embodiment, in which the extent of the projection of the flange 15 along the circumferential wall 2 relative to the diameter at the lower end of the circumferential wall 2 (referred to as the lower diameter hereinafter) is 5%, 30% and 35%, respectively, and (c) the conventional container 2A with a bottom.

In the preferred embodiment of the container 1, in which the extent of projection of the flange 15 along the circumferential wall 2 relative to the lower diameter of 5%, 30% and 35% implies that the extent of the diameter of the through hole 16 at the bottom of the container 1 relative to the lower diameter is 95%, 70% and 65%, respectively.

The baking time for each container 1, 1 and 2A was measured. Each container 1, 1 and 2A was used with the lower diameter of the circumferential walls 2, 2 and 2A being about 100 mm, and the heating temperature of the batter 10 was set at about 180° C.

As a result, the baking time of the container 1 of the first embodiment was 9 min. The baking times of the containers 1 of the preferred embodiment were 9 min., 10 min. and 11 min., respectively, showing that the baking time was increased as the size of the through hole was decreased. Further, the conventional container 2A with a bottom took 12 min. to bake a cake.

Consequently, in order to shorten the heating time of the batter 10, the best extent of projection of the flange 15 along the circumferential wall 2 is less than 5%, the preferred extent is less than 30%, and, feasibly, it may extend less than 35% of the lower diameter. In other words, the best extent of the diameter of the through hole 16 formed at the bottom of the container 1 is more than 95%, the preferable extent is more than 70%, and, feasibly, the extent of the diameter is greater than 65% of the lower diameter.

As described in detail above, in the preferred embodiment, the strength of the circumferential wall 2 is improved by providing the flange 15 projecting inward along the lower edge of the circumferential wall 2, which prevents the circumferential wall of the container 1 from losing its shape during the storage of the container 1.

Moreover, in the preferred embodiment, since the inner portion of the sheet 7 is caught on the lower surface of the second mold 5 when manufacturing the container 1, the container 1 is prevented from losing its shape due to the sheet 7 slipping out of position relative to the mold 5.

Furthermore, in the preferred embodiment, in contrast to the first embodiment, since the container 1 can be easily manufactured, it is not necessary to place the sheets 7 between sheets of kraft paper 6.

When the diameter of the through hole 16 at the bottom of the container 1 is more than 65% of the lower diameter of the circumferential wall 2, the through hole 16, through which the heat is directly transmitted to the batter 10, occupies a large portion of the entire bottom, and thus, the heating time is shortened.

The present invention may also be embodied in the following manners.

(1) The circumferential wall 2 of the container 1 is formed in a cylindrical manner in each embodiment mentioned above. However, the cross-section of the circumferential wall 2 may consist of various closed curves such as elliptical, oval and gourd shapes, etc. or may consist of polygons such as a triangle, a square, a pentagon, a hexagon, etc. The cross-section of the upper edge of the circumferential wall 2 may be different from that of the lower edge. In this case, the container 1 may be formed with first and second molds 4 and 5, which correspond to the cross-section of the upper and lower edges of the circumferential wall 2, respectively.

(2) In each embodiment described above, the number of sheets 7 placed between the first mold 4 and the second mold 5 may be appropriately altered. Further, in the first embodiment, the number of sheets of kraft paper 6 may be appropriately changed in accordance with the number of sheets 7.

(3) As the synthetic resin to laminate a single-layered material, a polyethylene terephthalate is given in each embodiment described above. However, the single-layered material may be laminated by polyethylene, polypropylene, vinylidene chloride and silicone instead. As the single-layered material, kraft paper, bleached kraft paper and fine paper can be utilized. The weight of the single-layered sheet per unit area is preferably in the range of 30 to 100 g/m$^2$, and more preferably between 40 and 80 g/m$^2$. The thickness of the adhesive layer is preferably in the range of 5 to 50 micrometers, and more preferably between 7 to 20 micrometers. The thickness of the laminated layer is preferably in the range of 5 to 50 micrometers, and more preferably between 7 and 20 micrometers.

If a single-layered material is formed by paper or non-woven fabric, the synthetic resin may be impregnated with the single-layered material.

Figure 9:
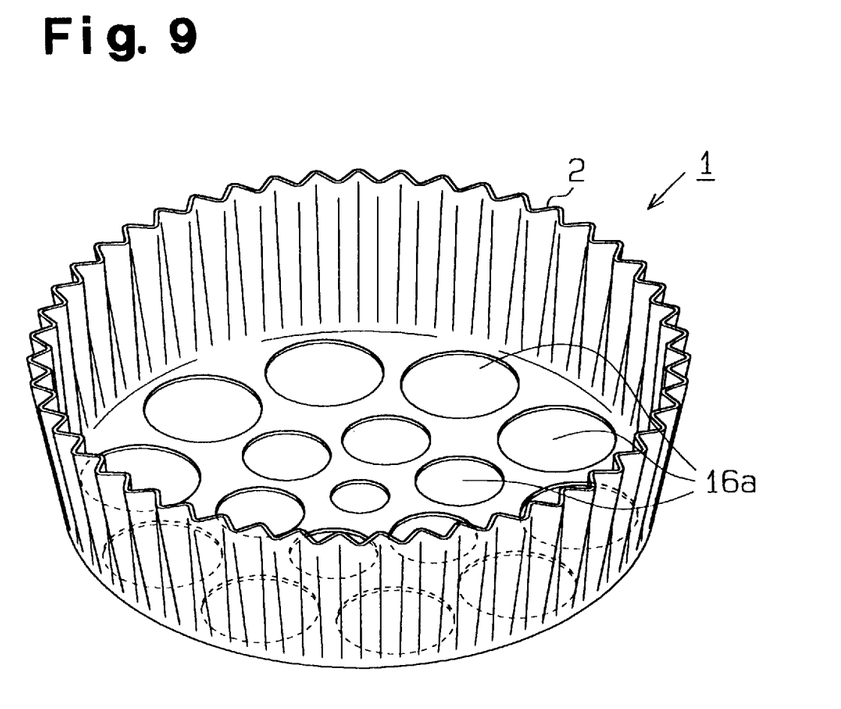
FIGS. 9 through 21 are perspective views showing other examples of containers.
Figure 10:
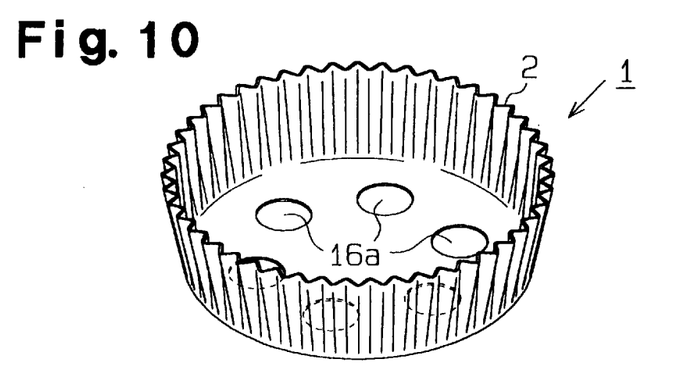
Figure 11:
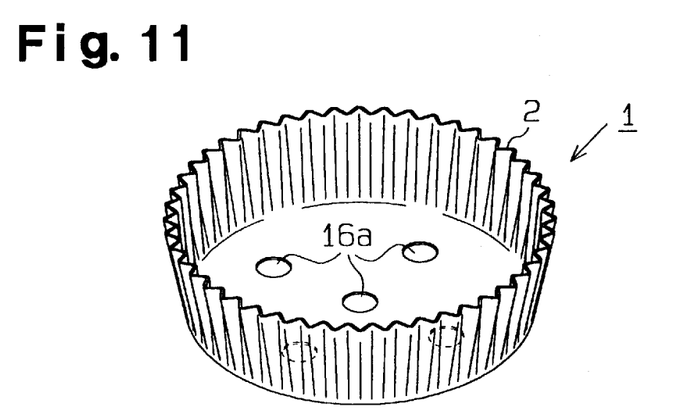
Figure 12:
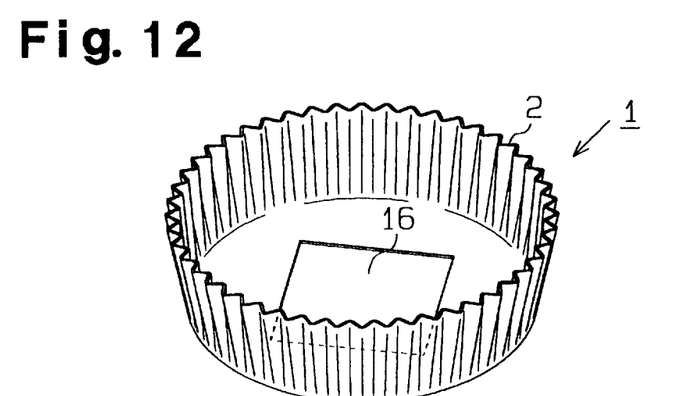
Figure 13:
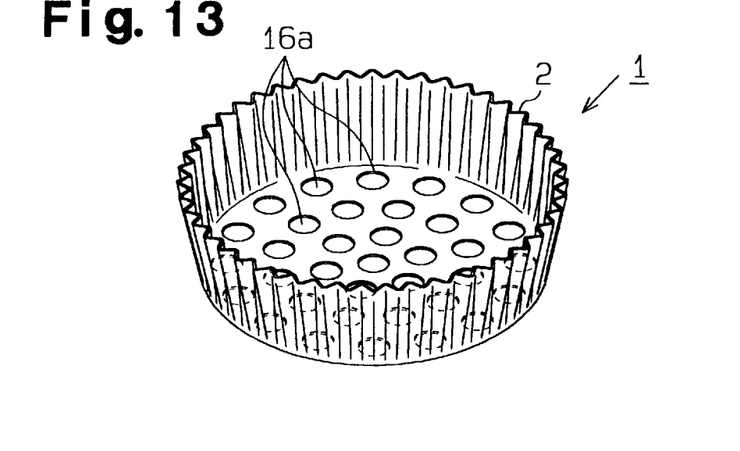
Figure 14:
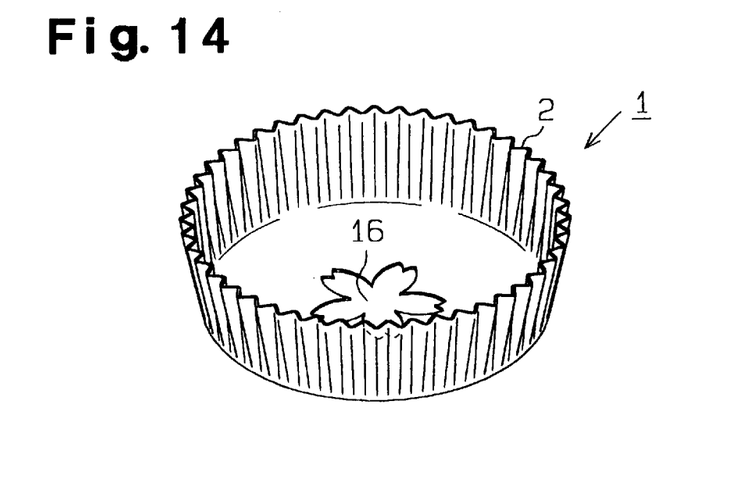
Figure 15:
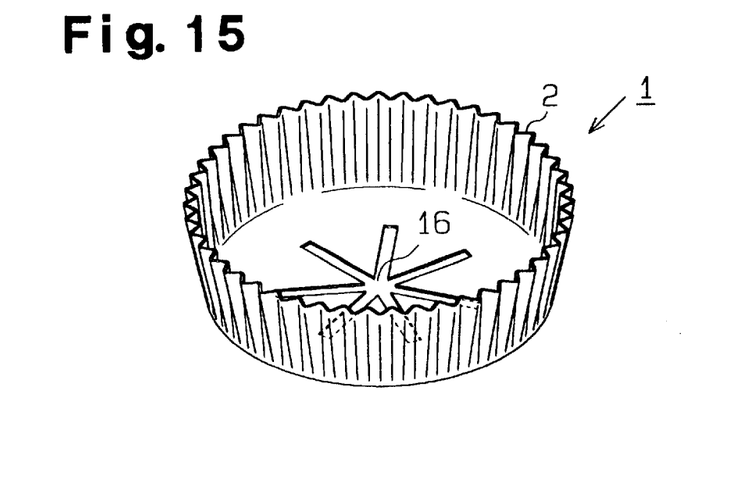
Figure 16:
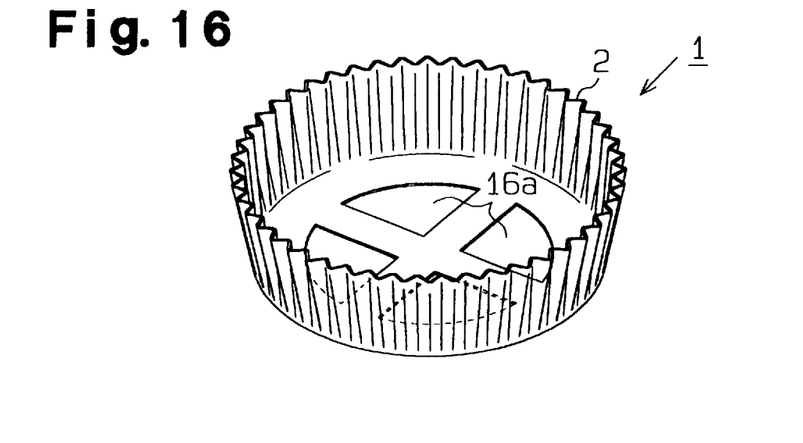
Figure 17:
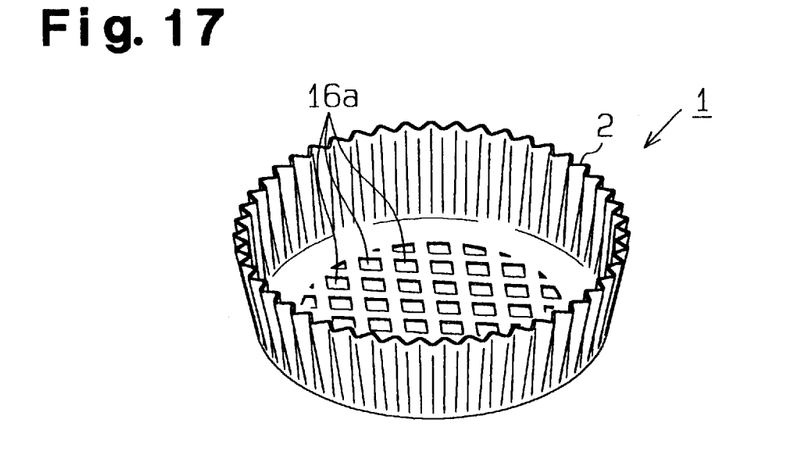
Figure 18:
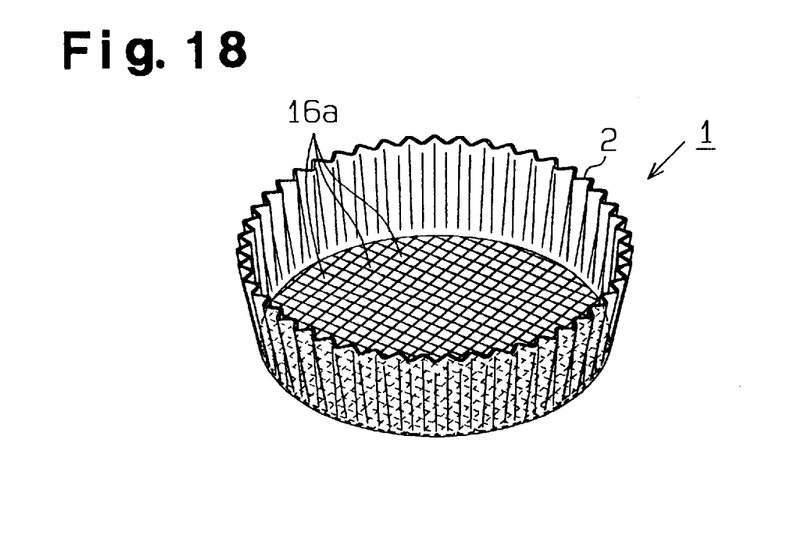
Figure 19:
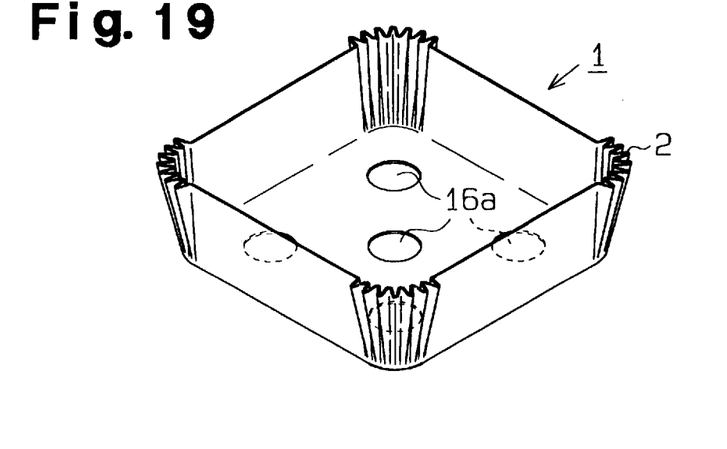
Figure 20:
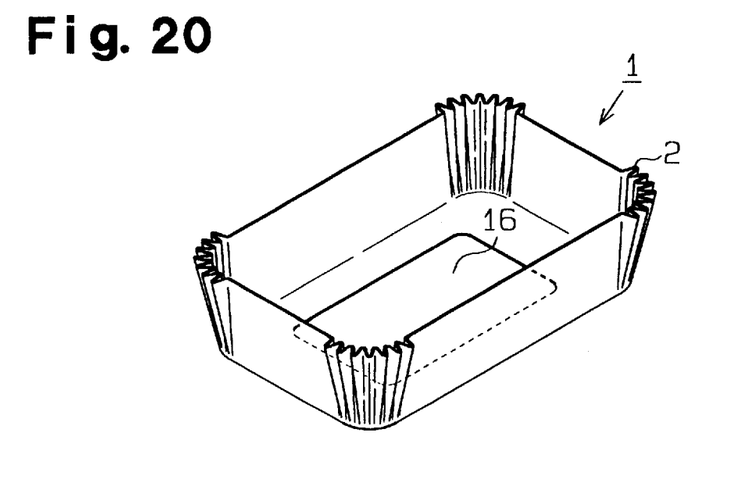
Figure 21:
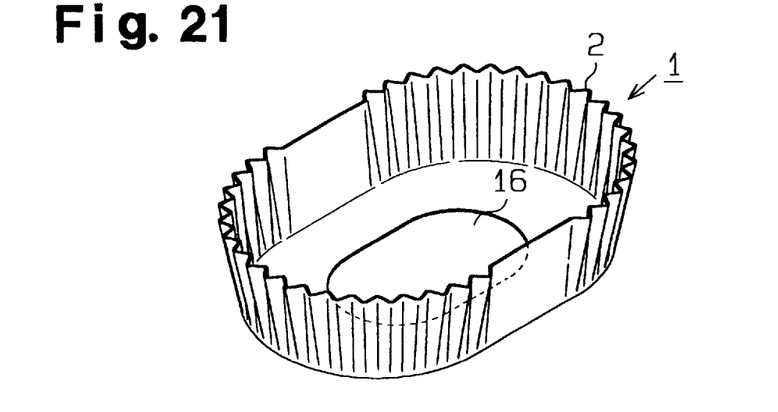

(4) In the second embodiment, a given range of the diameter of the through hole 16 that is formed by the periphery of the flange 15 at the bottom of the container 1 is described in terms of shortening the heating time. However, the same effect can also be achieved by forming a plurality of through holes 16a at the bottom of the container 1 as illustrated in FIG. 9. That is, a plurality of through holes 16a are formed so that the sum total of the opening area of each through hole 16a is equal to the opening area of the through hole 16 of the container 1 in the second embodiment. In this case as well, since the through hole, which is large enough to shorten the baking time with heat directly transmitted to the batter 10, can be established by the sum total of each opening area of the through holes 16a, the heating time of the batter 10 can be more shortened. Since a shape-holding force can also be applied to the container, the container does not lose its shape during storage.

(5) Only one circular through hole 16 is formed at the bottom of the container 1 in the first and the second embodiments. However, a plurality of through holes 16a can be formed, and the configuration of the through hole 16 and through holes 16a can be freely changed as shown in FIGS. 9 through 21. Further, a plurality of through holes 16a can be formed by meshing the bottom of the container 1. In this case, the heat can be easily transmitted to the batter 10 by way of the through hole 16, 16a, facilitating the dispersion of oil contained therein. This improves the taste of the cake. In the case of forming a plurality of through holes 16a, the through holes 16a allow efficient heating of the entire batter 10 with uniformity compared to one through hole 16 having a small diameter, which improves the heating efficiency even more.

In the specification, the cake batter means the batter of cake including wheat flour, sugar and cooking oil and is defined as including dough for bread, buns with a bean-jam filling, sponge cake, pie, madeleine, pound cake and cookies, etc.

According to the present invention as described above, since the cake batter is easily heated by way of the through hole occupying the bottom of the container, the dispersion of oil contained therein is facilitated. The production efficiency of cake is improved by further reducing the time for heating the cake batter. This improves the taste of the cake. Even when the cake batter is swollen by heating, the container is prevented from losing its shape. Since the strength of the container is increased by forming a flange along the circumferential wall 2, the container is prevented from losing its shape during storage. Since each through hole allows efficient heating of the cake batter with uniformity, and a shape-holding force is applied to the container, the container is prevented from losing shape during storage. The container having a through hole formed at the bottom can be efficiently manufactured without losing shape by means of clamp members, which are disposed to hold the sheets therebetween. Since the inner periphery of the sheets is caught on the surface of the second mold opposite to the cavity, it is not required to use the clamp members, and the container having a through hole formed at the bottom can be easily and efficiently manufactured without losing shape.

I claim:

1. A cake container for containing a cake batter, wherein said cake batter is heated to swell in a predetermined shape to form a cake, said container comprising:

a bottom portion having a predetermined area and a plurality of through holes, said plurality of said through holes collectively having the predetermined area of said entire bottom portion; and said container being made from:

a sheet of a material having a single layer, a layer of synthetic resin, and an adhesive layer adhering said resin layer to a surface of said sheet.

2. The cake container as set forth in claim 1, further comprising:

said sheet of material being white paper having a weight of 65 g/m$^2$, said synthetic resin layer being a polyethylene terephthalate film having a thickness of twelve micrometers, and said adhesive layer being a polyethylene layer having a thickness of thirteen micrometers.

3. A method for manufacturing a container having a bottom portion with a through hole, wherein a first mold having a cavity and a second mold fittable to said cavity are used to form said container from a film-like material sized to be larger than the cavity, said method comprising steps of:

forming a through hole in a central portion of the material;

positioning the material, which is held by clamp members, between the first mold and the second mold; and fitting the second mold into the cavity.

4. A method for manufacturing a container having a bottom portion with a through hole, wherein a first mold having a cavity and a second mold fittable to said cavity are used to form said container from a film-like material sized to be larger than the cavity, said method comprising steps of:

forming a through hole in a central portion of the material, said through hole being sized to be smaller than the cavity;

positioning the material, which is held by clamp members, between the first mold and the second mold; and fitting the second mold into the cavity.

5. A cake container for containing a cake batter, wherein said cake batter is heated to swell in a predetermined shape to form a cake, said container comprising:

a bottom portion having at least one through hole; and said container being made from:

a sheet of a material having a single layer and a surface, a layer of synthetic resin, and an adhesive layer adhering said resin layer to said surface of said sheet.

6. A cake container according to claim 5, further comprising:

said sheet of material being white paper having a weight of from 30 g/m$^2$ to 100 g/m$^2$, said synthetic resin layer being a polyethylene terephthalate film having a thickness of from 5 to 50 micrometers, and said adhesive layer being a polyethylene layer having a thickness of from 5 to 50 micrometers.

* * * * *